United States Patent [19]

Millsap

[11] 3,862,762
[45] Jan. 28, 1975

[54] SEAL FOR DRILL BIT BEARINGS
[75] Inventor: Norman E. Millsap, Sandy, Utah
[73] Assignee: Parken-Hannifin, Salt Lake City, Utah
[22] Filed: Feb. 26, 1973
[21] Appl. No.: 335,663

[52] U.S. Cl.................. 277/92, 277/94, 308/8.2
[51] Int. Cl..................... F16j 15/34, F16c 19/49
[58] Field of Search.......... 277/92, 95, 82, 94, 165; 308/8.2

[56] References Cited
UNITED STATES PATENTS

| | | | |
|---|---|---|---|
| 3,336,086 | 8/1967 | Reinsma | 277/95 X |
| 3,342,500 | 9/1967 | Knudson | 277/124 |
| 3,489,421 | 1/1970 | Neilson | 277/95 |
| 3,521,890 | 7/1970 | Holmes et al. | 277/165 X |
| 3,656,764 | 4/1972 | Robinson | 277/92 |

Primary Examiner—Samuel B. Rothberg
Attorney, Agent, or Firm—Donnelly, Maky, Renner & Otto

[57] ABSTRACT

A grease seal for drill bit bearings of the type wherein the shaft of a drill bit body and the rotatable cutter have bearing means therebetween and define an annular packing chamber therebetween including radially spaced apart concentric side walls of said shaft and cutter respectively and axially spaced apart end walls of said shaft and cutter respectively, said seal comprising a ring of resiliently deformable material radially squeezed between said side walls to form a static seal with said shaft and a dynamic seal with said cutter, the dynamic sealing portion of said ring being in the form of an annular lip which by its own resilience constantly presses against the side wall of said cutter to maintain the dynamic seal even after considerable wear of the ring and which lip additionally is biased radially outwardly by means of a ring of resilient rubber-like material contained in a groove inwardly adjacent to said lip. Furthermore, the ring in said groove provides another static seal with the end wall of the shaft to exclude drilling mud and cuttings.

11 Claims, 4 Drawing Figures

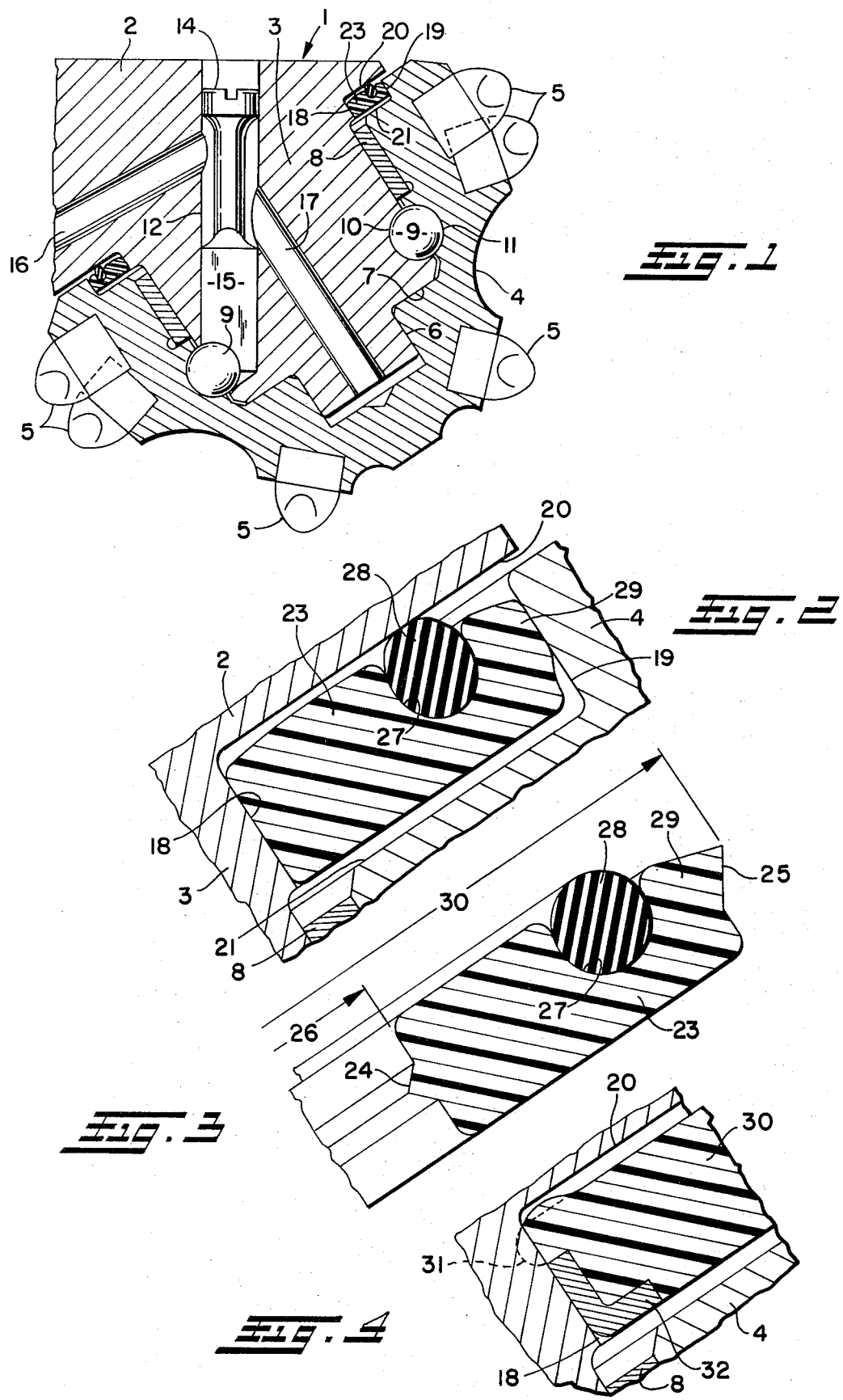

SEAL FOR DRILL BIT BEARINGS

SUMMARY OF THE INVENTION

It is a principal object of this invention to provide a long life lubricant seal for the bearing means between a drill bit shaft and a cutter rotatively mounted on said shaft by said bearing means, said seal being characterized in that it provides an effective and low friction dynamic seal which is in the form of a lip which, by its own resilience and the resilience of a rubber-like ring therewithin, is constantly pressed radially outwardly into dynamic sealing contact with said cutter.

It is another object of this invention to provide a seal of the character indicated which is in the form of a ring whose inside diameter is an interference fit on said shaft and forms a static seal therewith while a deformable axially extending lip of the seal is pressed radially outwardly to form a dynamic seal with said cutter, said seal additionally being provided, within said lip, with a resilient rubber-like ring which presses the lip radially outwardly and additionally forms another static seal with said shaft.

BRIEF DESCRIPTION OF THE DRAWING

FIG. 1 is a cross-section view of the bearing shaft portion of a drill bit body showing a cutter rotatably mounted on said shaft portion and having the present seal disposed between said shaft and cutter to form static and dynamic lubricant seals for the bearings between the shaft and cutter and additionally to form another static seal with said shaft to exclude drilling mud and cuttings;

FIG. 2 is a much enlarged radial cross-section view showing one form of seal between the cutter and shaft;

FIG. 3 is a radial cross-section view showing the seal of FIG. 2 in its relaxed condition prior to assembly in the packing chamber defined between the cutter and the shaft; and FIG. 4 is a fragmentary cross-section view similar to FIG. 2 except illustrating another form of seal.

DETAILED DESCRIPTION OF THE DRAWING

As shown in FIG. 1 the drill bit 1 is of generally familiar form comprising a drill bit body 2 having a shaft 3 on which a cutter 4 having carbide inserts 5 is rotatably supported by radial thrust and axial thrust bearings 6 and 7 and by a sleeve bearing 8 which preferably is press fitted in the cutter 4, said shaft 3 and cutter 4 being retained together as by means of balls 9 which fit in mating grooves 10 and 11 in the shaft 3 and in the cutter 4. The balls 9 are loaded through passage 12 and are retained in place as by the retainer plug 14 which has flats 15 defining passages for supply of grease or other lubricant to the balls 9 and to the bearing surfaces of bearing 8 and shaft 3 from the lubricant supply passage 16. The shaft 3 also has another passage 17 for supply of lubricant to the bearings 6 and 7.

The shaft 3 and cutter 4 define therebetween a packing chamber comprising radially spaced apart concentric side walls 18 and 19 of the shaft 3 and cutter 4 respectively and axially spaced apart annular end walls 20 and 21 on the shaft 3 and cutter 4 respectively. Radially squeezed between the side walls 18 and 19 is a seal 23 which has static sealing engagement with the wall 18 of the shaft 3 and dynamic sealing engagement with the wall 19 of the cutter 4. Said seal 23 also has static sealing engagement with the annular end wall 20 of the shaft 3 to exclude drilling mud and cuttings. The static and dynamic seals, of course, retain grease or other lubricant under pressure between the shaft 3 and the cutter 4 to lubricate the bearings 6, 7, and 8 and the balls 9 and grooves 10 and 11 and also to exclude drilling mud and cuttings. As known in the art, a grease feeding device (not shown) will be connected to the passage 16, said device preferably being of the type which equalizes the pressure of the lubricant and the drilling fluid.

One form of seal 23 as shown in FIG. 3 in its relaxed condition and in FIG. 2 in its assembled condition in the packing chamber defined between the shaft 3 and the cutter 4 comprises a generally rectangular ring having a static sealing rib 24 on its inside diameter and a dynamic sealing rib 25 on its outside diameter, and preferably the inside diameter of the ring 23 as denoted by the reference number 26 is of slightly smaller diameter than the diameter of the inner side wall 18 of the packing chamber so that the ring 23 will be an interference fit on said inner cylindrical wall with increased static sealing pressure by reason of the yet smaller static sealing rib 24. The ring 23 is preferably made of fluoroplastic material such as CTFE, $PVF_2$, TFE, or FEP which are characterized in having a low coefficient of friction and high abrasion resistance so as to provide a good, low friction dynamic seal of the outer sealing rib 25 with the outer side wall 19 of the packing chamber.

The axially outer side of the ring 23 inwardly adjacent the outside diameter thereof is formed with a groove 27 in which is disposed a ring 28 (preferably an O-ring of rubber-like material) which projects axially as shown in FIGS. 2 and 3, said groove 27 additionally forming with the dynamic sealing rib 25 an annular lip 29. The outside diameter of the ring 23 as denoted by the reference numeral 30 is preferably of slightly larger diameter than the diameter of the outer side wall 18 in the cutter 4 and hence when the ring 23 is installed in the packing chamber, the lip 29 will be deformed radially inwardly as shown in FIG. 2 and such deformation thereof will deform the O-ring 28 so as to make firm and leak-proof static sealing engagement with the end wall 20 of the shaft 3 so as to exclude drilling mud and cuttings.

As evident from the foregoing, the lip 29 when deformed as in FIG. 2 exerts by its own resilience an outward pressure to maintain the dynamic sealing engagement with the radially outer side wall 19 over an extended period of time despite progressive wear of the lip 29 and, in addition, the resilience of the O-ring 28 assists in maintenance of the dynamic seal between the lip 29 and the outer side wall 19 of the cutter 4. The end of the ring 23 which is adjacent to the end wall 21 of the cutter 4 is out of contact with said end wall 21 when the seal is assembled in the packing chamber and hence lubricant has access to the area of the dynamic seal. Furthermore, upon initial assembly of the seal 23 in the packing chamber, the pressure of the O-ring 28 against the end wall 20 tends to deflect the ring 23 about its inside diameter to frusto-conical form and the spring back of said ring 23 assists in maintaining of the static seal between the O-ring 28 and said end wall 20.

The seal 30 shown in FIG. 4 is preferably the same as that of FIGS. 2 and 3 insofar as the dynamic sealing lip 29 and O-ring 28 are concerned and differs essentially in that the static seal on the inside diameter of the ring 30 is formed by a rib 31 initially of smaller diameter than the radially inner side wall 18 of the packing chamber and that the seal 30 is provided with a metallic locking ring 32 which has an interference fit with the inner cylindrical side wall 18 thus to firmly retain the seal 30 in place on the shaft 3.

The embodiments of the invention in which an exclusive property or privilege is claimed are defined as follows:

1. A seal for drill bit bearings of the type wherein a shaft and a cutter rotatably supported on said shaft by bearing means therebetween define therebetween an annular packing chamber including concentric radially spaced apart side walls and axially spaced apart annular end walls; said seal comprising a ring of resilient material having inside and outside diameters in resilient pressure engagement with said side walls respectively to constitute static and dynamic seals thereat, effective to seal bearing lubricant between said shaft and cutter, said dynamic seal comprising an annular lip on said ring in resilient pressure engagement with one of said side walls; said ring having an annular groove on the side thereof adjacent to the end wall of said shaft to define said lip; and a packing ring of rubber-like material disposed in said groove in sealing engagement with the end wall of said shaft, said packing ring implementing the resilience of said lip in achieving and maintaining pressure engagement of said lip in dynamic sealing engagement with said one side wall.

2. The seal of claim 1 wherein said lip in the relaxed condition of said ring is flared so as to be resiliently deformed toward cylindrical form when assembled in said chamber thus to establish pressure engagement for establishing and maintaining such dynamic sealing contact with said one side wall.

3. A seal for drill bit bearings of the type wherein a shaft and a cutter rotatably supported on said shaft by bearing means therebetween define therebetween an annular packing chamber including concentric radially spaced apart side walls and axially spaced apart annular end walls; said seal comprising a ring of resilient material having inside and outside diameters in resilient pressure engagement with said side walls respectively to constitute static and dynamic seals thereat, effective to seal bearing lubricant between said shaft and cutter, said dynamic seal comprising an annular lip on said ring in resilient pressure engagement with one of said side walls; said ring having a portion adjacent said lip which projects axially therefrom into static sealing engagement with the end wall of said shaft which, in conjunction with the static seal between said ring and the side wall of said shaft, is effective to retain said ring and shaft together against relative rotation.

4. The seal of claim 3 wherein the side of said ring opposite to that which contains said projecting portion is axially spaced from the end wall of said cutter whereby said cutter and ring are in frictional engagement only in the zone of the dynamic seal between said lip and said one side wall.

5. The seal of claim 4 wherein said projecting portion exerts axial pressure on said ring radially outward of the side wall of said shaft thus to tend to spring said ring to frusto-conical form whereby the resiliency of said ring tends to maintain static sealing engagement between said projecting portion and said end wall of said shaft.

6. The seal of claim 3 wherein said projecting portion constitutes a packing ring of rubber-like material which is disposed in an annular groove which defines said lip.

7. The seal of claim 6 wherein said ring when assembled in said chamber deforms said lip radially inwardly to exert deforming pressure on said packing ring whereby the latter is deformed to exert increased static sealing pressure with said end wall of said shaft and augments the resilience of said lip in increasing the pressure engagement between said lip and said one side wall thus to maintain such dynamic seal despite substantial wear of said lip.

8. The seal of claim 7 wherein said ring is of fluoroplastic material having good abrasion resistance and low frictional properties so as to offer low resistance to rotation of said cutter and to resist deterioration by presence of chips, sand, drilling mud and the like encountered in use of the drill bit.

9. A circular sealing ring of resilient material having a substantially rectangular radial cross-section of radial thickness greater than its axial thickness and having a V-shaped sealing rib therearound; said ring having on one side thereof inwardly adjacent said sealing rib a circular groove to define with said rib a tapered annular lip which is adapted to be deformed toward cylindrical form when said ring is installed in a packing chamber having a radially outer wall of less diameter than the diameter of said rib, and to define a radially inner portion of said ring of radial thickness greater than that of said lip; said inner portion being of axial thickness greater than the axial thickness of said ring radially outward of said groove; and a packing ring in said groove projecting axially beyond the side of the ring containing said groove; said lip when deformed as aforesaid decreasing the radial width of said groove thus to deform said packing ring to tend to cause it to laterally project an increasing amount into sealing engagement with a radially extending end wall of a packing chamber in which said ring is adapted to be installed; said groove being of circular radial cross-section exceeding 180° and said packing ring being an O-ring which is snapped into said groove to be retained by said ring during handling and storage.

10. The ring of claim 9 wherein said side of said ring containing such groove is beveled radially outward of such groove to yet further decreased axial thickness and to constitute one side of said sealing rib.

11. The ring of claim 9 wherein the interior of said inner portion has a sealing rib projecting radially inward for sealing pressure engagement with the radially inner wall of an annular packing chamber.

* * * * *